United States Patent [19]

Gifford

[11] Patent Number: 4,924,555
[45] Date of Patent: May 15, 1990

[54] WATER COOLED ROLLER SHUCKER FOR SHELLFISH

[76] Inventor: William J. Gifford, 18 N. Franlin Blvd., Pleasantville, N.J. 08232

[21] Appl. No.: 384,424

[22] Filed: Jul. 25, 1989

[51] Int. Cl.⁵ ............................................. A22C 29/04
[52] U.S. Cl. ............................................. 17/74; 17/48
[58] Field of Search ........................... 17/74, 71, 48, 51

[56] References Cited

U.S. PATENT DOCUMENTS

| | | | |
|---|---|---|---|
| 3,230,578 | 1/1966 | Maruin et al. | 17/74 |
| 3,562,855 | 2/1971 | Willis | 17/48 |
| 3,614,806 | 10/1971 | Henry | 17/48 |
| 3,662,431 | 5/1972 | Willis | 17/48 |
| 4,532,677 | 8/1985 | Wenstrom et al. | 17/74 |

*Primary Examiner*—Willis Little
*Attorney, Agent, or Firm*—Fleit, Jacobson, Cohn, Price, Holman & Stern

[57] ABSTRACT

A water cooled roller shucker having a pair or plurality of pairs of parallel rollers which rotate in opposite directions and are driven from one end thereof by any suitable power mechanism to drive the rollers at a desired adjustable speed with each roller including a spiral rib on the external surface thereof to maintain clams in an upright position as the oppositely turning rollers move them longitudinally in underlying relation to a longitudinally elongated burner positioned above the top edges of the upright clams thereby heating the clams and causing the abductor muscles to be released thereby enabling the clam shells to open. Each of the rollers is water cooled to prevent the rollers from warping thereby enabling direct impingement of flame from the burners on the upstanding clams to effectively open the clams without overheating the rollers and without "cooking" the "meat" of the clams. The rollers are provided with inclined guide plates to guide the clams from a supply end along the rollers to maintain them in the upright position. The roller shucker of this invention can be used on board a vessel engaged in clamming or it can be mounted on a dock or other suitable location and is compact in construction but yet has a large capacity for effectively opening clam shells.

14 Claims, 2 Drawing Sheets

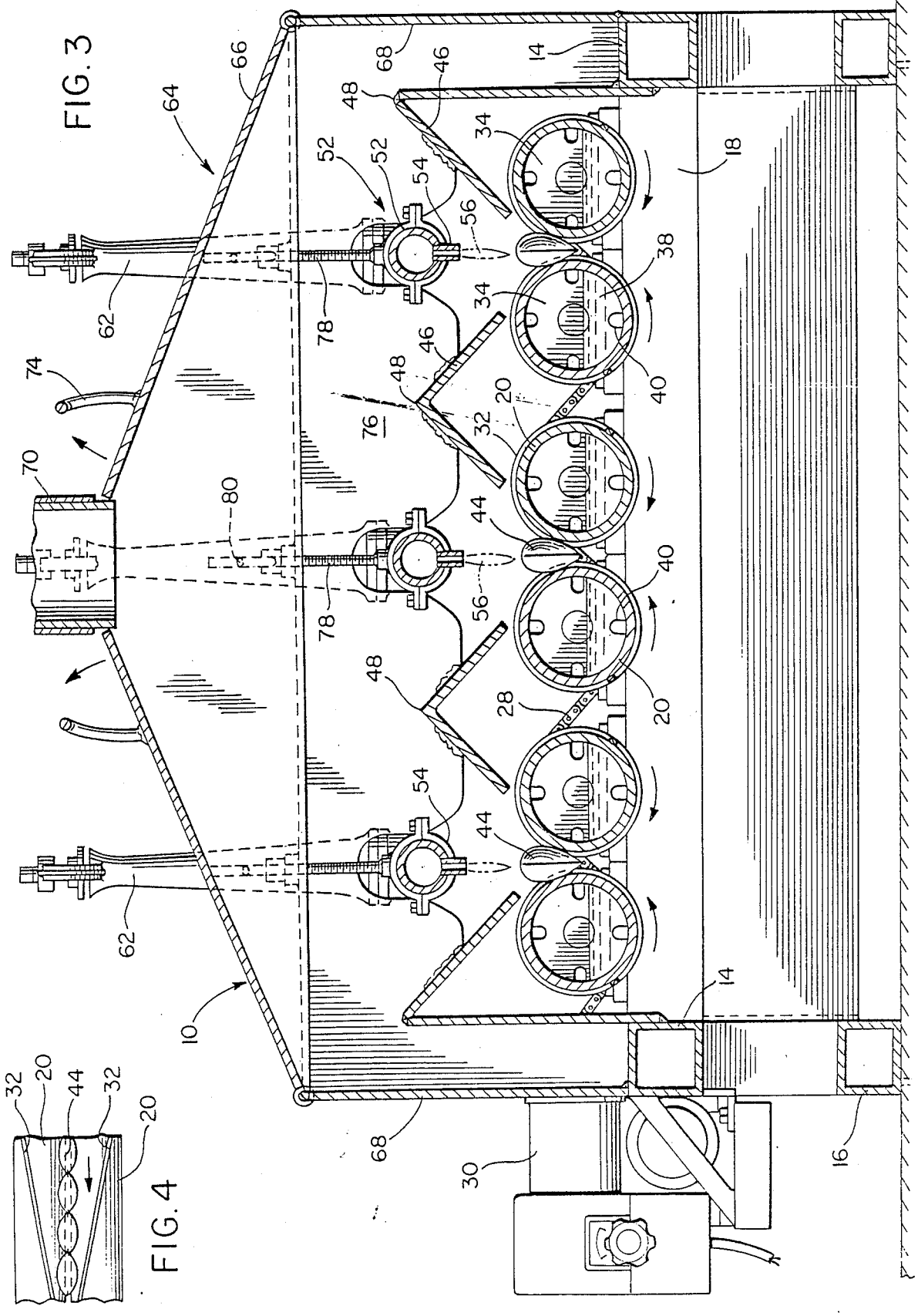

WATER COOLED ROLLER SHUCKER FOR SHELLFISH

BACKGROUND OF THE INVENTION

1. FIELD OF THE INVENTION

The present invention generally relates to a machine for shucking shellfish such as clams and similar species of shellfish including but not limited to clams, quahogs, scallops and conchs in which the shells are retained in closed position by the attachment of abductor muscles on the interior surface thereof so that the "meat" of the shellfish is protected. The shucker of the present invention is a water cooled roller shucker having a pair or plurality of pairs of parallel rollers which rotate in opposite directions and are driven from one end thereof by any suitable power mechanism to drive the rollers at a desired adjustable speed with each roller including a spiral rib on the external surface thereof to maintain the clams in upright position as the oppositely turning rollers move them longitudinally in underlying relation to a longitudinally elongated burner positioned above the top edges of the upright clams thereby heating the clams and causing the abductor muscles to be released thereby enabling the clam shells to open. Each of the rollers is water cooled to prevent the rollers from warping thereby enabling direct impingement of flame from the burners on the upstanding clams to effectively open the clams without overheating the rollers and without "cooking" the "meat" of the clams. The rollers are provided with inclined guide plates to guide the clams from a supply end along the rollers to maintain them in the upright position. The roller shucker of this invention can be used on board a vessel engaged in clamming or it can be mounted on a dock or other suitable location and is compact in construction but yet has a large capacity for effectively opening clam shells.

INFORMATION DISCLOSURE STATEMENT

Many efforts have been made to open shellfish including various types of bivalves including arrangements which shock the shellfish, heat the shellfish and otherwise impact shellfish against a surface or the like in an effort to cause the abductor muscles to be released from the interior surface of the shell to enable the two halves of the bivalve to open thus enabling the "meat" to be separated from the shells. The following U.S. patents relate to this subject matter.

3,203,034
3,230,578
3,614,806
3,594,859
3,688,344
4,691,412

None of the above patents disclose the specific structure of the present invention although they do relate to shucking shellfish.

SUMMARY OF THE INVENTION

An object of the present invention is to provide a shellfish shucking machine which includes water cooled rollers receiving clams or similar shellfish between a pair of adjacent rollers which rotate in opposite directions and include a spiral rib on the external surface thereof to maintain the clams in a generally vertical, upright condition as they are moved longitudinally by the ribs on the rollers with the rollers and clams being disposed in underlying relation to a longitudinally elongated burner which directs flames directly onto the upper edge portions of the clam to heat those areas of the clam to cause the abductor muscle to release the shell components of the clam to enable the clams to be easily separated with the "meat" floating in relation to the shells when they are deposited in a shell separating tank due to the difference in specific gravity of the "meat" and shells.

Another object of the invention is to provide a shellfish shucker in accordance with the preceding object in which the water cooled rollers enable direct impingement of flame without causing the rollers to warp thereby enabling more rapid movement of the clams and higher temperatures of the flame to increase the production capacity of the shucker with the rollers being driven at a variable speed to enable the relative movement of the clams to be varied depending upon the species of clams or shellfish, the flame temperatures and other conditions to maintain maximum capacity of the shucker.

A further object of the invention is to provide a shellfish shucking machine in accordance with the preceding objects in which the rollers are provided with inclined guide plates to guide the clams in relation to the rollers and the ribs on the rollers enable the rollers to be positioned in a substantially horizontal plane or at a smaller angle than if the rollers were provided with a smooth surface since the ribs cause the clams to move in a positive manner as the rollers and ribs thereon move in opposite rotational directions.

Still another important object of the present invention is to provide a water cooled roller shucker for shellfish which is relatively simple in construction, capable of opening large quantities of shellfish, capable of being effectively mounted on board a vessel when clamming thereby enabling the shellfish to be opened and the "meat" separated from the shells by the crew of the vessel prior to it returning to port with the device also being capable of use in a stationary location such as on a dock or the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse, sectional view, on an enlarged scale, taken substantially upon a plane passing section line 3—3 on FIG. 1 illustrating specific structural details of the shucker including the rollers and location of the burners, guide plates and clams.

FIG. a detailed fragmental, elevational view illustrating the rollers and ribs thereon.

DESCRIPTION OF THE PREFERRED EMBODIMENT

Figure 1:
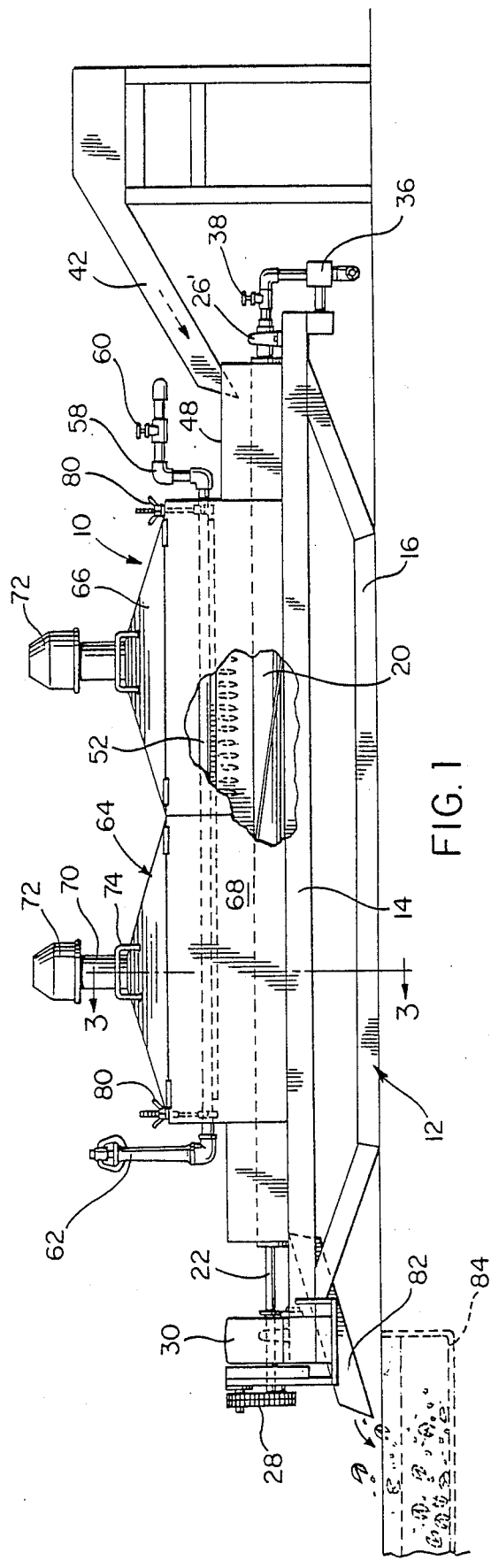
FIG. 1 is sides elevational view of the shucker of the present invention.
Figure 2:
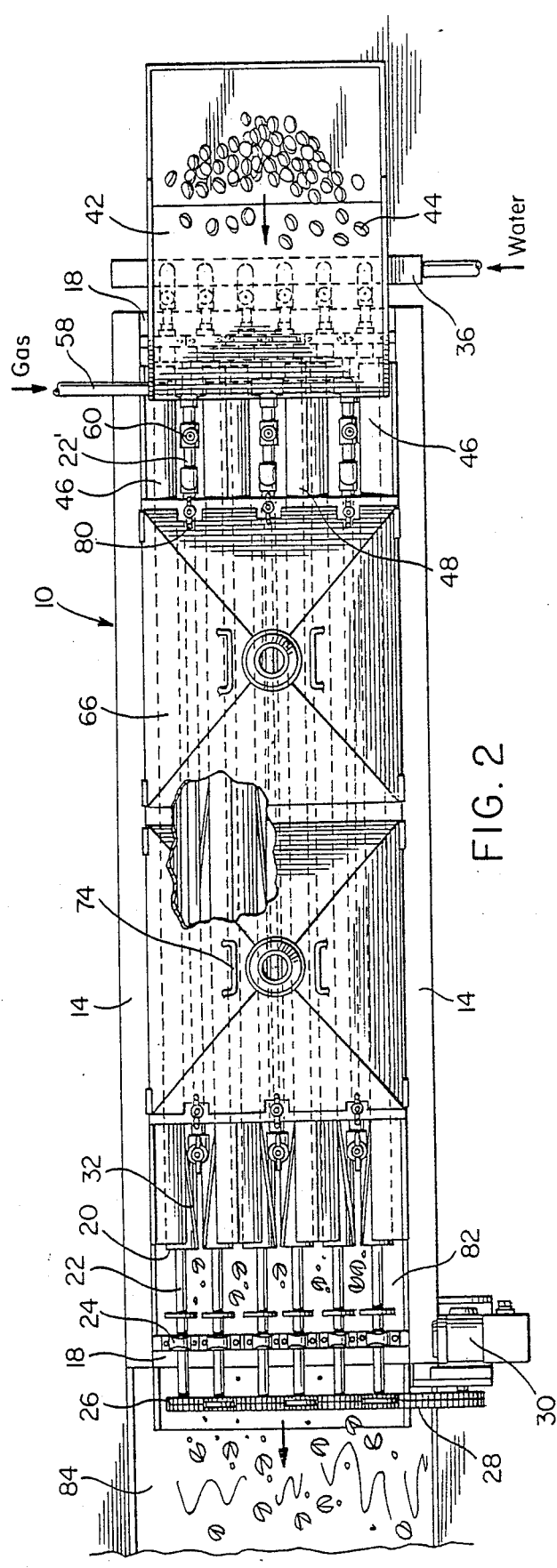
FIG. 2 is a top plan view thereof.

Referring now specifically to the drawings, the shucker of the present invention is generally designated by reference numeral 10 and includes a supporting frame generally designated by reference numeral 12 which includes longitudinal side members 14 and depending support members 16 with transverse frame members 18 connecting the side members 14. Supported from the transverse frame members 18 is a plurality of elongated, cylindrical rollers 20 which include an axially extending shaft 22 which extends from both ends thereof with the shafts 22 being rotatably supported and journalled by bearing assemblies 24 attached to the transverse support beams 18. One end of each shaft 22 is provided with a sprocket gear 26 engaged by a sprocket chain 28 driven from a motor assembly 30 mounted at one side of the frame 12 as illustrated in FIGS. 1 and 2 with the sprocket gears and chain being oriented so that a pair of adjacent rollers are rotatably driven in opposite rotational directions with the motor or drive unit 30 being capable of driving the rollers 20 at desired variable speeds with all of the rollers being driven at the same speed but adjacent rollers being driven in opposite directions.

The rollers 20 each include a spiral rib 32 thereon in the form of a bar secured to the external surface of the roller 20. As illustrated in FIG. 3, each of the rollers 20 is of hollow construction and provided with end plates 34 securing the roller concentrically to its supporting shaft 22 which extends outwardly from the end plate but not through the roller. The shaft at the inlet end of each roller is a tubular shaft 22' that is connected with a pressurized water manifold 36 through a valve 38 with the hollow shafts 22' also being supported by bearing assemblies 26' with the water being supplied to the rollers to cool the interior of the rollers by passing therethrough with the rollers being at least partially filled with water 38 as illustrated in FIG. 3. The end plates 34 include openings 40 therein for enabling discharge of water from the interior of the rollers. The inlet end of the shucking machine includes an inclined chute 42 positioned above the ends of the rollers 20 inwardly of the bearing structures 26' to discharge clams 44 slidably downwardly on the chute for positioning between rollers by engaging upwardly and outwardly diverging guide plates 46 which, as illustrated in FIG. 3, are in the form of angle iron members with the apex of the angle iron members being designated by reference numeral 48 for causing the clams 44 to be separated and positioned between adjacent rollers of a pair with the clams 44 being supported vertically or on edge, as illustrated in FIG. 3, with the opposite rotation of the rollers causing the clams to move longitudinally of the shucker from the inlet chute 42 towards the discharge or driving end of the rollers.

Positioned above and in alignment with each row of clams is an elongated burner generally designated by reference numeral 50 that includes an elongated tube 52 with a plurality of burner nozzles or orifices 54 thereon for discharging flame 56 downwardly toward the upper edge of the clams. The burners 50 are supplied with gas from a supply pipe 58 which also includes regulators and control valves 60 and the like and a gas venturi 62 is provided at the opposite end of each of the burner tubes 52. Thus, a controlled rate of burning of propane or similar fuel can be obtained with the flame 56 being directed onto the clams and even if the flame impinges adjacent surfaces of the rollers, the water cooled rollers will not become warped due to high temperatures.

The burners 50 are enclosed by a pair of pyramidal hoods generally designated by reference numeral 64 and which include inclined top wall components 66 and depending side walls 68 which engage with the side frame members 14. The apex of the two adjacent hoods which cover the rollers have vent structures 70 with a cap 72 on the upper end thereof for discharging combustion products. Handle structure 74 are provided on the hoods to enable removal thereof when desired. The ends of the hoods are provided with draft doors 76 which can be opened or closed or adjusted thus confining the products of combustion and heat but enabling discharge through the vents 70.

Also, the burners 50 are adjustably supported from the hood by screw threaded members 78 having wing nuts 80 thereon which engage the upper surface of the hood to vary the position of the burners in relation to the rollers and the clams moving downwardly along the "crotch" or "nip" formed by the adjacent pair of rollers. The ribs on the rollers enable the rollers to be oriented substantially in a horizontal plane and the movement of the clams is adjusted by varying the speed of the rollers or the rollers can be oriented at a slight inclined angle to facilitate movement from one end to the other of the rollers. The discharge end of the rollers is spaced from the bearings 24 and the transverse support 18 so that the opened clam shells drop into an inclined chute 82 and into a separation tank 84 where the shells are separated from the "meat" due to difference in specific gravity and the "meat" floats to a discharge conveyor for subsequent processing.

The machine may be constructed with various numbers of rollers and the components may vary in dimension. However, 6" rollers have been found to be adequate with the roller bars being ¼" stainless steel rods spiraled around and welded to the exterior surface of the metal rollers with all of the components being constructed of stainless steel thus making the operation sanitary and easy to maintain in a sanitary condition. The rollers turn in opposite directions thus maintaining the clams in an upright arrangement between adjacent pairs of rollers due to the opposite rotational directions and the spiral rib thereon. In actual practice, the capacity of this device is quite high and capable of shucking 150 bushels of ocean sea clams per hour. The angle flat steel guide plates contain and retain the shellfish in appropriate relationship to each individual set of rollers. Pumping water lengthwise through the rollers from one end to the other cools the rollers and prevents warping thereby enabling the burner flame to be directly applied to the clams between the two rollers. The burners are stationary and the rollers rotate in opposite directions and this relationship is maintained and does not rely upon vibration to move the clams through the machine. By increasing the volume the machine becomes economically feasible and the "meat" is not cooked or overheated which would deteriorate its quality and the machine is fully capable of mounting on board a vessel as well as being mounted on a dock or the like which enables the crew of the vessel to shuck the shellfish prior to or while the vessel is returning to port.

The overall length of the machine is on the order of 20' with the burners approximately 10' in length. Each pair or set of rollers has a single burner associated therewith with the burner being approximately 12" above the rollers with the flame from the burners being from 2" to 1' in length according to the species of shellfish being shucked. The temperature could vary from 1500° F. to 2500° F. according to the species of shellfish being processed. The shellfish travel at approximately 12" per second but this speed can be increased or decreased according to the amount of heat required for a particular species and the speed can be adjusted by the variable speed motor which also varies the capacity. Alignment of the shellfish or clams enables a constant temperature to be maintained over each of the rows of clams or shellfish being opened. The application of heat in a precise location provides for increased final yield and also provides for complete separation of the "meat" from the shell. The water that is heated as it passes through the rollers can be used to preheat the shellfish by passing the water over the shellfish as the shellfish enter the shucking machine thus increasing the efficiency of the machine by reducing the total heat required to cause the shellfish to open.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

WHAT IS CLAIMED AS NEW IS AS FOLLOWS:

1. An apparatus for shucking shellfish such as clams comprising at least one pair of parallel adjacent, cylindrical rollers supported in generally horizontal position, means guiding shellfish into the area above the rollers, means positioning the shellfish in upright position, means- on each roller to move the shellfish longitudinally of the rollers as the rollers are rotated, means driving the rollers in opposite rotational directions, and burner means positioned above the area between the rollers to impinge flame onto the upper edge of the upright shellfish as they move longitudinally by the rollers for causing the shellfish to open and to separate when "meat" of the shellfish from the shell when discharged into water in a separating tank.

2. The structure as defined in claim 1 wherein said means on each roller to move the shellfish includes a spiral rib rigid with the outer surface of the roller.

3. The structure as defined in claim 2 together with means cooling the rollers to prevent them from warping when subjected to heat.

4. The structure as defined in claim 3 wherein said means cooling the rollers includes water supply means, each of said rollers being hollow and having the interior thereof communicated with the water supply means to at least partially fill the rollers, each of the rollers including closure end plates with openings restricting discharge of water therefrom to enable impingement of flame against the clams without warping the rollers.

5. The structure as defined in claim 1 wherein said means driving the rollers in opposite directions includes a variable speed drive means to vary the rotational speed of the rollers and the speed of the clams in relation to the burner means.

6. The structure as defined in claim 1 wherein the means guiding shellfish into the area above the rollers includes an inclined chute and inclined plates extending upwardly and outwardly in diverging relation.

7. The structure as defined in claim 1 wherein said burner means includes an elongated tube communicated with a supply of combustible gaseous fuel, said tube including a plurality of nozzles through which the gaseous fuel exits and burns with the flames depending from the tube for impingement against the clams.

8. The structure as defined in claim 7 together with means supporting the tube in vertically adjustable relation to the rollers and clams supported thereon.

9. The structure as defined in claim 1 together with a hood overlying the burner means and rollers with the hood including depending peripheral walls to enclose the space above the rollers and confine the flames and heat produced by the burner means.

10. The structure as defined in claim 9 wherein said hood includes a vent at the uppermost portion thereof to vent combustion gases therefrom.

11. The structure as defined in claim 1 together with an inclined chute at one end of the rollers for receiving opened clams therefrom for depositing the open clams into a separation tank in which the "meat" floats in the water and the shell falls downwardly in the water in the separation tank due to difference in specific gravity.

12. A shellfish shucking machine comprising a plurality of pairs of parallel, generally horizontally disposed rollers with the rollers in each pair being driven at a variable speed in opposite directions with both rollers in the pair being rotated at the same speed, each of the rollers including a spiral rib thereon for engaging and moving shellfish positioned edgewise between the upwardly facing adjacent surfaces of the oppositely rotating rollers in each pair, upwardly and outwardly diverging guide plates overlying each pair of rollers to maintain the shellfish in generally vertical position to expose a peripheral edge of the shellfish upwardly, burner means extending longitudinally of each pair of rollers and discharging flame onto the edge supported shellfish as they move longitudinally to cause the shellfish to open.

13. The structure as defined in claim 12 wherein each of said rollers is in the form of a hollow cylinder, water circulating means communicated with the interior of each of the rollers for circulating water therethrough to cool the rollers and prevent warping due to application of heat.

14. The structure as defined in claim 13 together with a hood enclosing said burner means, an inlet chute for shellfish above one end of the rollers and a discharge chute for opened shellfish under the opposite end of the rollers, a separation tank with water therein receiving the opened shellfish from the discharge chute for separating the "meat" from the opened shells.

* * * * *